US011878882B2

(12) United States Patent
Miyazaki et al.

(10) Patent No.: US 11,878,882 B2
(45) Date of Patent: Jan. 23, 2024

(54) PAPER SHEET STORAGE DEVICE

(71) Applicant: FUJITSU FRONTECH LIMITED, Tokyo (JP)

(72) Inventors: Hiroshi Miyazaki, Inagi (JP); Nobuhiko Ishii, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 441 days.

(21) Appl. No.: 17/308,346

(22) Filed: May 5, 2021

(65) Prior Publication Data

US 2021/0253389 A1 Aug. 19, 2021

Related U.S. Application Data

(63) Continuation of application No. PCT/JP2018/042733, filed on Nov. 19, 2018.

(51) Int. Cl.
*B65H 1/14* (2006.01)
*G07D 11/13* (2019.01)
(Continued)

(52) U.S. Cl.
CPC ............... *B65H 1/14* (2013.01); *B65H 31/10* (2013.01); *B65H 31/18* (2013.01); *G07D 11/13* (2019.01);
(Continued)

(58) Field of Classification Search
CPC ... B65H 1/04; B65H 1/08; B65H 1/14; B65H 31/10; B65H 31/18; B65H 2403/51;
(Continued)

(56) References Cited

U.S. PATENT DOCUMENTS 6,283,469 B1 * 9/2001 Weber ...................... B65H 1/14 271/160
2007/0257419 A1 * 11/2007 Wilcox .................... B65H 1/14 271/148
2012/0292847 A1 * 11/2012 De La Hamayade . B65H 3/128 271/104

FOREIGN PATENT DOCUMENTS

JP 62-153060 7/1987
JP 5-334523 12/1993
(Continued)

OTHER PUBLICATIONS

International Search Report, dated Dec. 25, 2018, in corresponding International Application No. PCT/JP2018/042733 (6 pp.).
(Continued)

*Primary Examiner* — Prasad V Gokhale
(74) *Attorney, Agent, or Firm* — STAAS & HALSEY LLP

(57) ABSTRACT

A paper sheet storage device includes a storage space in which paper sheet is stored; a mounting table that is provided in the storage space and on which the paper sheet is accumulated and placed; a support base that supports the mounting table; a first lifting lowering mechanism that lifts and lowers the mounting table between a high position and a low position relative to the support base; and a second lifting lowering mechanism that lifts and lowers the support base in the storage space. The support base and the first lifting lowering mechanism are disposed within a projection area in which the mounting table is projected on a plane orthogonal to a lifting lowering direction in which the support base is lifted and lowered by the second lifting lowering mechanism.

7 Claims, 18 Drawing Sheets

(51) Int. Cl.
*B65H 31/10* (2006.01)
*B65H 31/18* (2006.01)
*G07D 11/16* (2019.01)

(52) U.S. Cl.
CPC .......... *G07D 11/16* (2019.01); *B65H 2403/51* (2013.01); *B65H 2405/353* (2013.01); *B65H 2511/15* (2013.01); *B65H 2701/1912* (2013.01); *G07D 2211/00* (2013.01)

(58) Field of Classification Search
CPC .... B65H 2405/1116; B65H 2405/1117; B65H 2405/35; B65H 2405/353; B65H 2405/354; B65H 2701/1912; G07D 11/009; G07D 11/0093; G07D 11/12; G07D 11/13; G07D 11/16; G07D 2211/00
See application file for complete search history.

(56) References Cited

FOREIGN PATENT DOCUMENTS

| | | |
|---|---|---|
| JP | 2001-26365 | 1/2001 |
| JP | 2003-95450 | 4/2003 |
| JP | 2003-151007 | 5/2003 |
| JP | 2012-53637 | 3/2012 |

OTHER PUBLICATIONS

Written Opinion of the International Searching Authority, dated Dec. 12, 2018, in corresponding International Application No. PCT/JP2018/042733 (3 pp.).

* cited by examiner

PAPER SHEET STORAGE DEVICE

CROSS-REFERENCE TO RELATED APPLICATION

This application is a continuation of International Application No. PCT/JP2018/042733, filed on Nov. 19, 2018 and designating the U.S., the entire contents of which are incorporated herein by reference.

FIELD

The embodiment discussed herein is related to a paper sheet storage device.

BACKGROUND

A banknote handling device such as an automated teller machine (ATM) includes a banknote storage device for storing deposited banknotes. Known as this type of banknote storage device is a banknote storage device in which a mounting table, on which banknotes are accumulated and placed, is lifted and lowered, by a lifting lowering mechanism in a storage space in which banknotes are stored.

In this banknote storage device, the mounting table is gradually lowered as the banknotes are stored in the storage space, and the storage space becomes full of the stored banknotes when the mounting table moves to bottom surface, which is a lower end of the storage space. Further, rollers such as a pickup roller, a feeding roller, and a separation roller for loading and unloading banknotes into and out of the storage space, are provided in an upper part of the storage space.

[Patent Document 1] Japanese Laid-open Patent Publication No. 2012-53637.

In the case of the banknote storage device described above, one option to increase the number of banknotes that can be stored in the storage space, is to reduce a thickness of the mounting table in a direction in which the banknotes are accumulated in the storage space, that is, in a direction in which the mounting table is lifted and lowered. In a case where the thickness of the mounting table is reduced, a height of a mounting surface of the mounting table is lowered as the thickness of the mounting table is reduced. As a result, when the mounting table is moved to the topmost position by the lifting lowering mechanism, the banknotes on the mounting surface are not brought into contact with the pickup roller that feeds the banknotes on the mounting table. In a case where a height (the topmost position) to which the mounting table can be lifted by the lifting lowering mechanism, is extended upward, in order to bring the banknotes on the mounting surface into contact with the pickup roller, the lifting lowering mechanism interferes with the feeding roller and other members. If the position of the lifting lowering mechanism is changed in order to avoid interference between the lifting lowering mechanism and the feeding roller and other members, a space occupied by the lifting lowering mechanism around the mounting table, increases, which undesirably leads to an increase in size of the whole device.

SUMMARY

According to an aspect of the embodiments, a paper sheet storage device includes: a storage space in which paper sheet is stored; a mounting table that is provided in the storage space and on which the paper sheet is accumulated and placed; a support base that supports the mounting table; a first lifting lowering mechanism that lifts and lowers the mounting table between a high position and a low position relative to the support base; and a second lifting lowering mechanism that lifts and lowers the support base in the storage space, wherein the support base and the first lifting lowering mechanism are disposed within a projection area in which the mounting table is projected on a plane orthogonal to a lifting lowering direction in which the support base is lifted and lowered by the second lifting lowering mechanism.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An embodiment of a paper sheet storage device disclosed herein will be described below in detail with reference to the drawings. Note that the paper sheet storage device disclosed herein is not limited by the embodiment below.

Configuration of Banknote Handling Device

Figure 1:
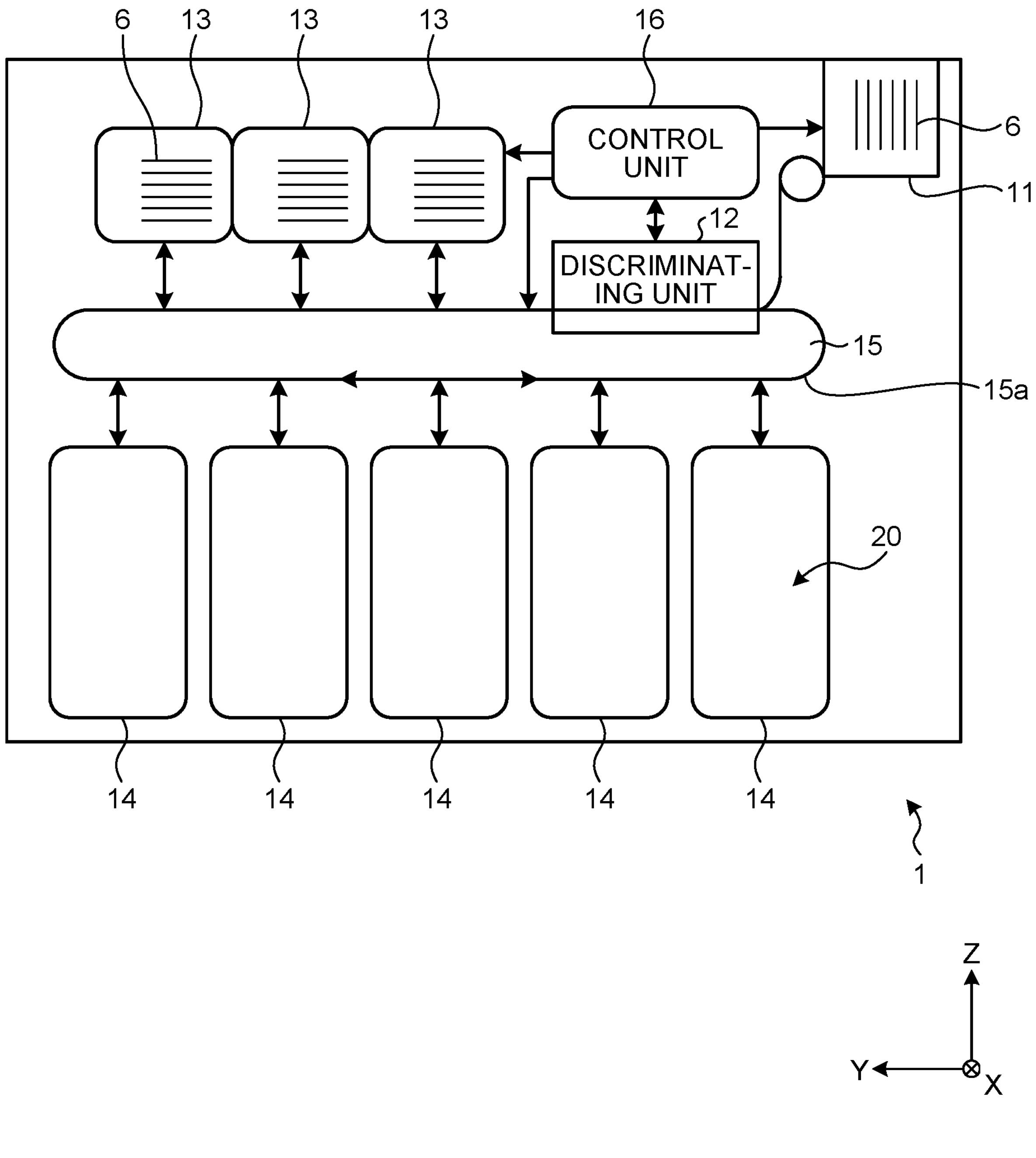
FIG. 1 is a schematic view illustrating a banknote handling device according to an embodiment.

FIG. 1 is a schematic view illustrating a banknote handling device according to the embodiment. As illustrated in FIG. 1, a banknote handling device 1 according to the embodiment includes; a deposit withdrawal unit 11 for depositing and withdrawing banknotes 6, a discriminating unit 12 for discriminating banknotes 6 conveyed from the deposit withdrawal unit 11, a plurality of temporary holding units 13 for temporarily accommodating the banknotes 6 conveyed from the discriminating unit 12, and a plurality of storage units 14 for storing the banknotes 6 conveyed from the temporary holding units 13.

Further, the banknote handling device 1 includes a convey mechanism 15 for conveying the banknotes 6 among the units 11, 12, 13, and 14 along a convey path 15*a*, and a control unit 16 for controlling the units 11, 12, 13, and 14, respectively. The convey mechanism 15 has a convey belt and a plurality of rollers (not illustrated) that constitute the convey path 15*a* for conveying the banknotes 6, and is disposed so as to connect the deposit withdrawal unit 11, the discriminating unit 12, the temporary holding units 13, and the storage units 14, respectively. The convey mechanism 15 is configured to be capable of conveying the banknotes 6 to and from the storage units 14. The control unit 16 is electrically connected to the discriminating unit 12, the temporary holding units 13, the storage units 14, and the convey mechanism 15, respectively.

As illustrated in FIG. 1, the storage units 14 incorporated in the banknote handling device 1 correspond to the banknote storage device according to the embodiment. Hereinafter, each of the storage units 14 will be referred to as the banknote storage device 14. For convenience of explanation, when the banknote handling device 1 is viewed from the deposit withdrawal unit 11 side in FIG. 1, a width direction of the banknote handling device 1, a front-rear direction of the banknote handling device 1, and a top-bottom direction of the banknote handling device 1 are referred to as an X direction, a Y direction, and a Z direction, respectively. Also in FIG. 1 and the subsequent drawings, the X, Y, and Z directions are illustrated as that in FIG. 1. In the present embodiment, the banknotes 6 are used as an example of paper sheet, but the paper sheet is not limited to the banknotes 6. Examples of the paper sheet also include marketable securities such as banknotes of exchange, checks, gift certificates, various securities, and stock certificates.

Configuration of Banknote Storage Device

Figure 2:
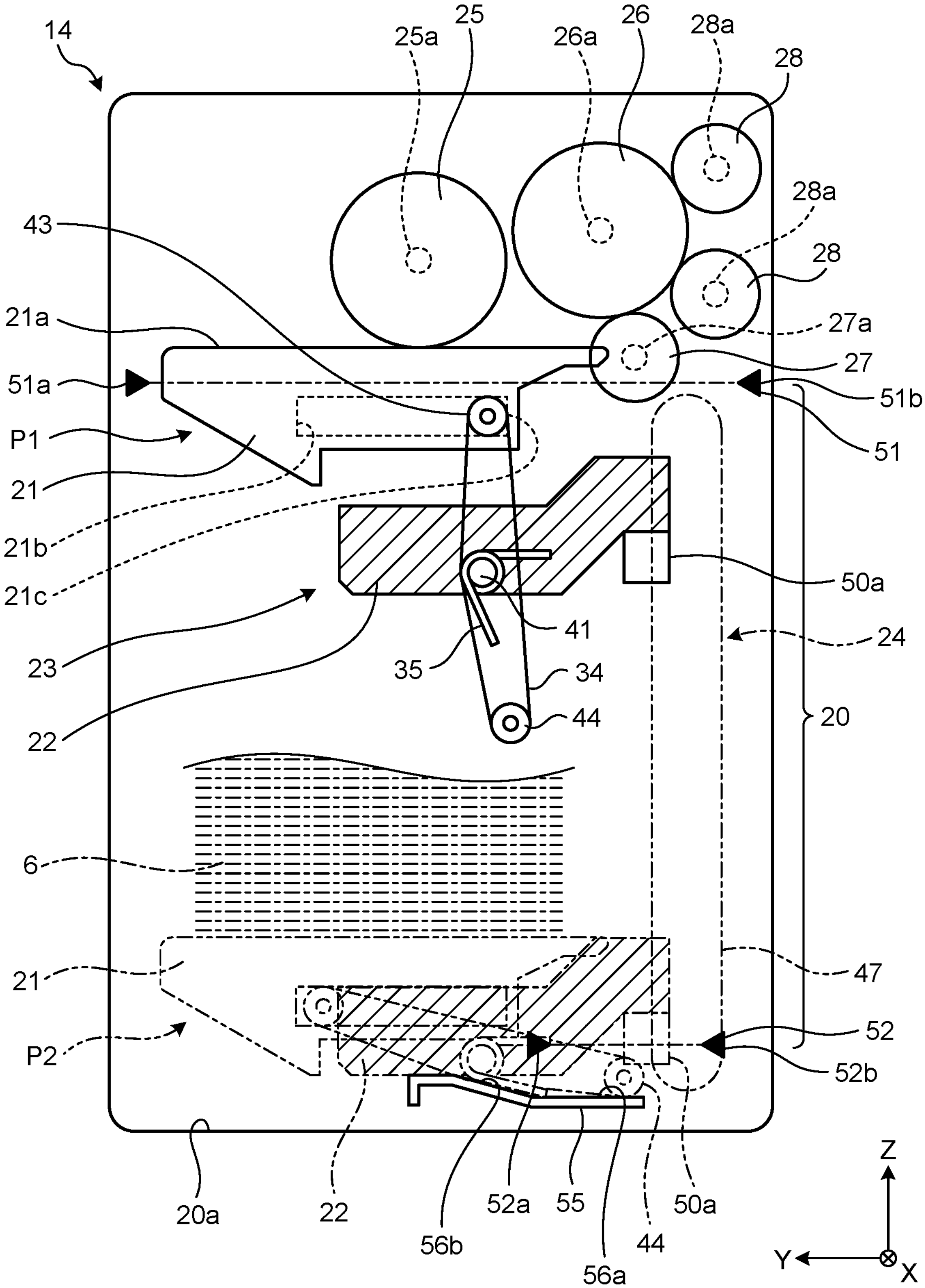
FIG. 2 is a schematic view illustrating a banknote storage device according to the embodiment.
Figure 3:
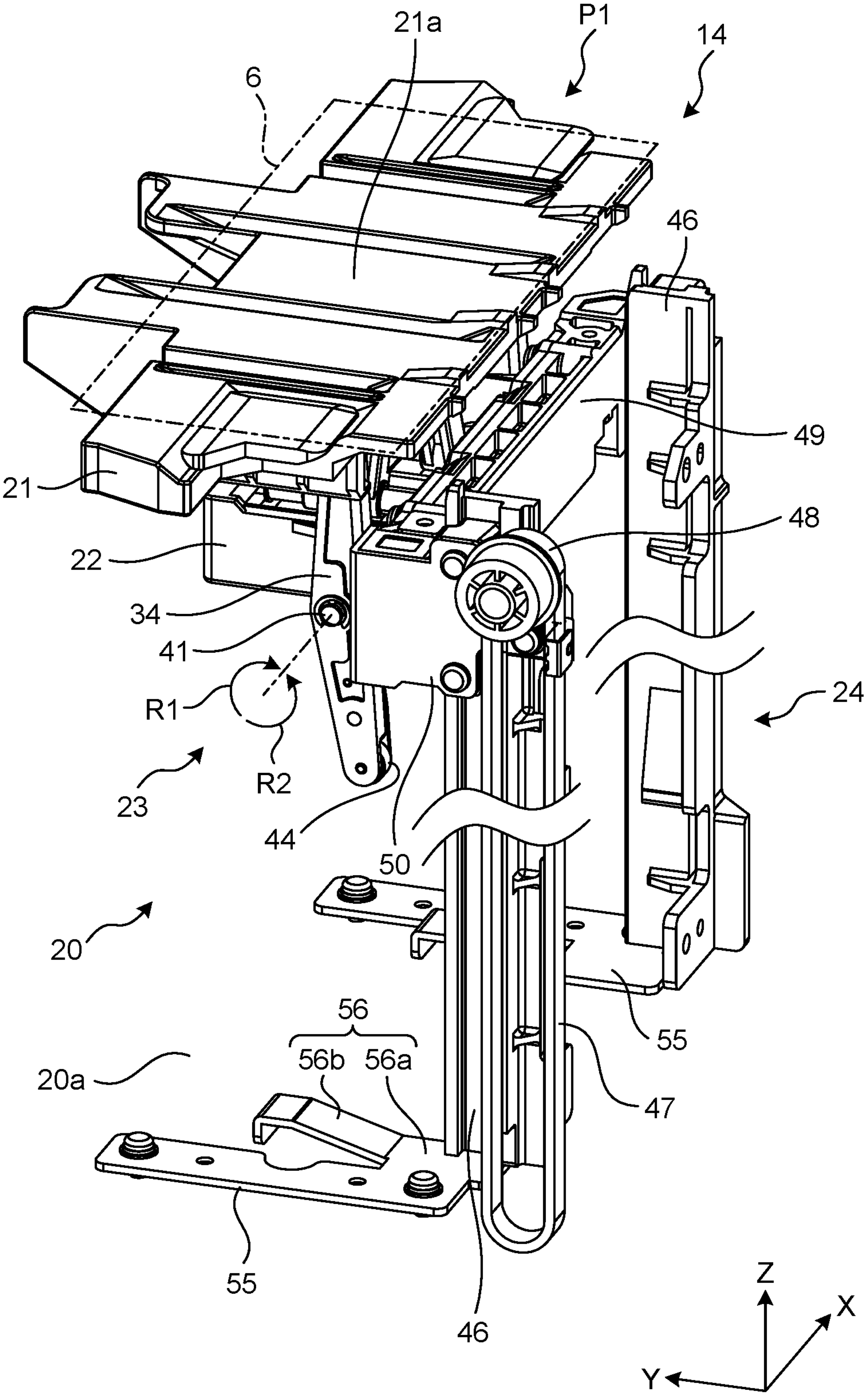
FIG. 3 is a perspective view illustrating a first lifting lowering mechanism and a second lifting lowering mechanism of the banknote storage device according to the embodiment.

FIG. 2 is a schematic view illustrating the banknote storage device 14 according to the embodiment. FIG. 3 is a perspective view illustrating a first lifting lowering mechanism and a second lifting lowering mechanism of the banknote storage device 14 according to the embodiment.

As illustrated in FIGS. 2 and 3, the banknote storage device 14 includes a storage space 20 in which the banknotes 6 are stored, a stage 21 that is provided in the storage space 20 and serves as a mounting table on which the banknotes 6 are accumulated and placed, a support base 22 that supports the stage 21, a first lifting lowering mechanism 23 that lifts and lowers the stage 21 between a high position P1 and a low position P2 in the Z direction relative to the support base 22, and a second lifting lowering mechanism 24 that lifts and lowers the support base 22 in the Z direction in the storage space 20.

Further, the banknote storage device 14 includes a pair of rotary levers 34 for operating the first lifting lowering mechanism 23, and a torsion spring 35 that serves as an urging member that urges the rotary levers 34 in the R1 direction for lifting the stage 21 to the high position P1.

The stage 21 has a mounting surface 21*a* on which the banknotes 6 are placed and moves in parallel between the high position P1 and the low position P2 while the mounting surface 21*a* keeps a horizontal posture parallel to the X-Y plane. When the stage 21 is lowered to the low position P2, the stage 21 is placed on the support base 22. Further, the mounting surface 21*a* of the stage 21 moves in a horizontal posture between an upper end and a lower end of the storage space 20 along the top-bottom direction (Z direction). As illustrated in FIG. 3, the banknotes 6 are placed on the mounting surface 21*a* of the stage 21 so that a long side thereof extends along the X direction.

Figure 11:
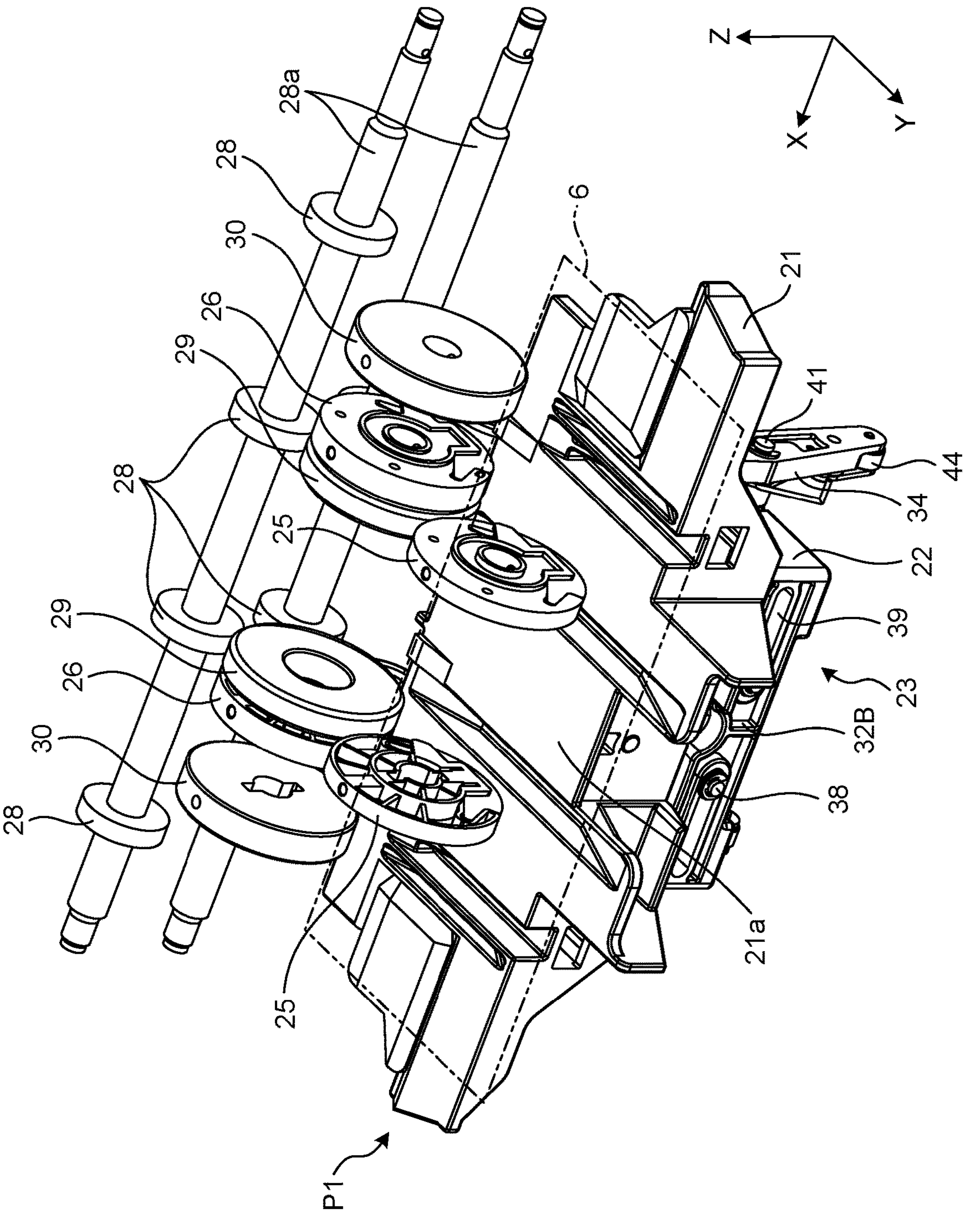
FIG. 11 is a perspective view illustrating convey rollers of the banknote storage device according to the embodiment.

Further, as illustrated in FIG. 2, convey rollers such as a pickup roller 25, a feeding roller (feed roller) 26, a separation roller 27, and an acceleration roller 28 are provided in an upper part of the storage space 20 (see FIG. 11). The banknote storage device 14 carries the banknotes 6 into the storage space 20 and carries out the banknotes 6 from the storage space 20 by the convey rollers. Details of the convey rollers will be described later.

Regarding the posture of the banknote storage device 14, the X and Y directions are not limited to the horizontal direction, and the Z direction is not limited to the vertical direction. Further, in the present embodiment, a side, on which the banknotes 6 are taken in and out of the storage space 20, is referred to as a front side of the banknote storage device 14, and a side opposite to the front side is referred to as a rear side of the banknote storage device 14.

Configuration of First Lifting Lowering Mechanism

Figure 4:
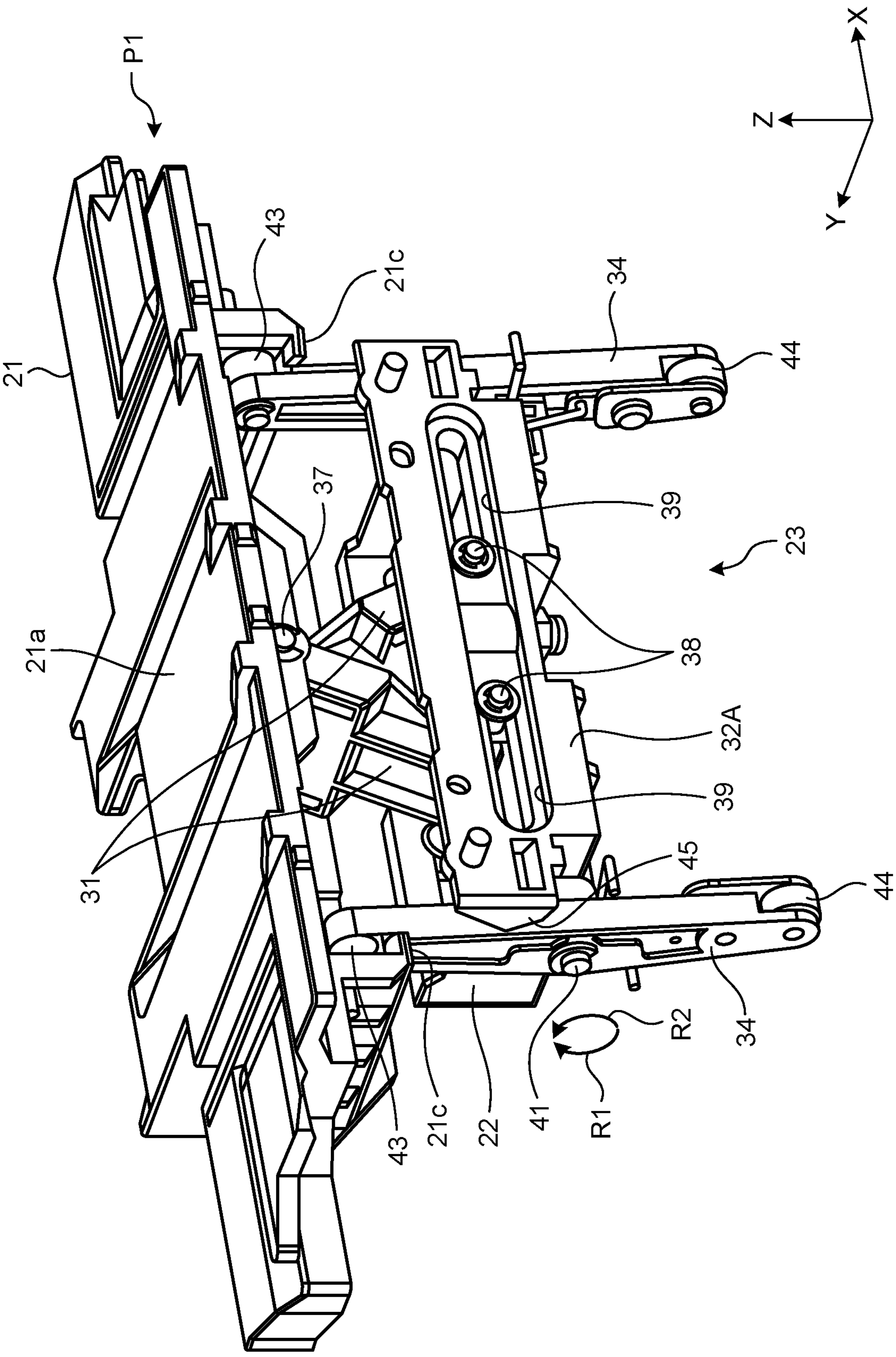
FIG. 4 is a front perspective view illustrating a state in which a stage has been lifted to a high position by the first lifting lowering mechanism of the banknote storage device according to the embodiment.
Figure 5:
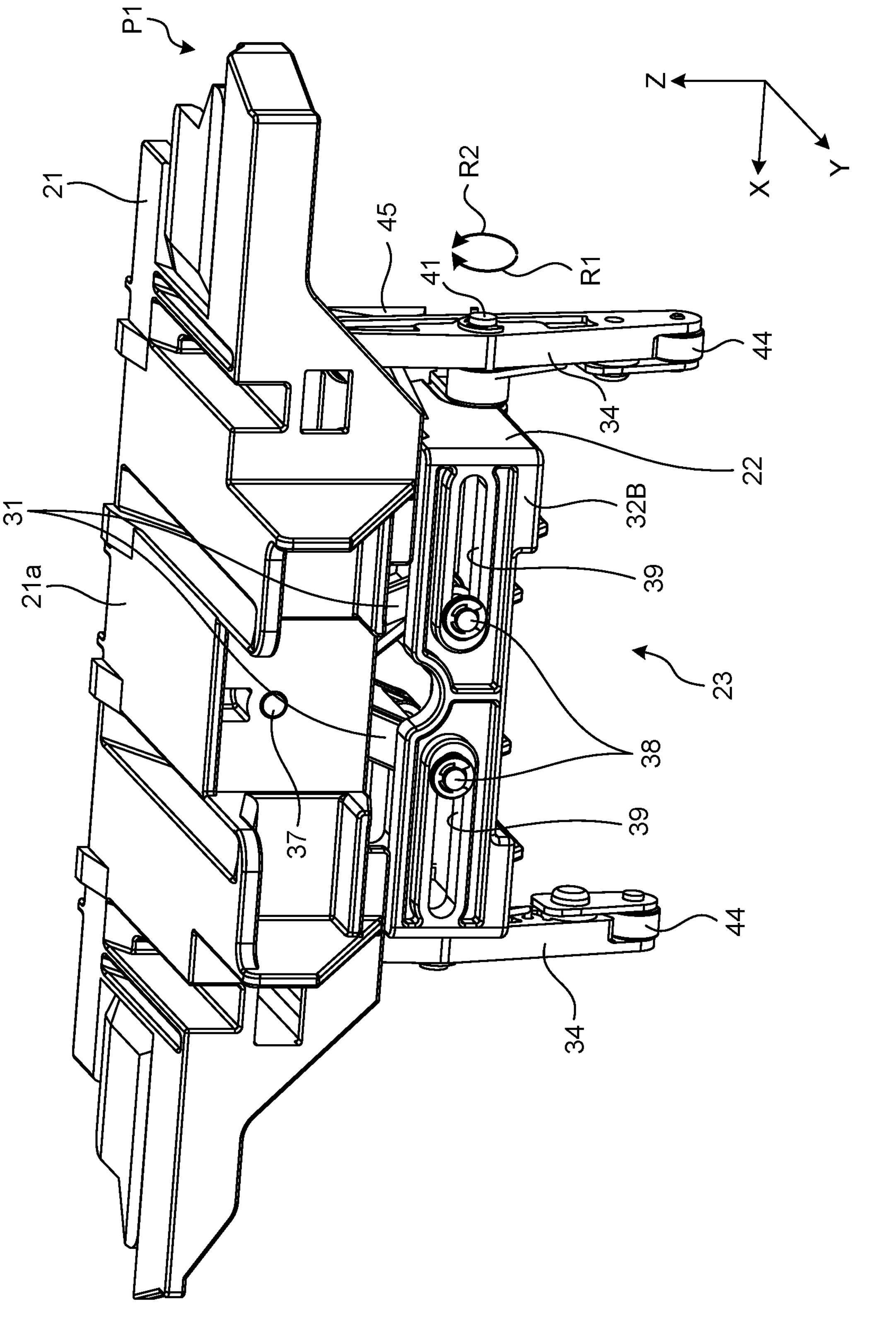
FIG. 5 is a rear perspective view illustrating a state in which the stage has been lifted to the high position by the first lifting lowering mechanism of the banknote storage device according to the embodiment.
Figure 6:
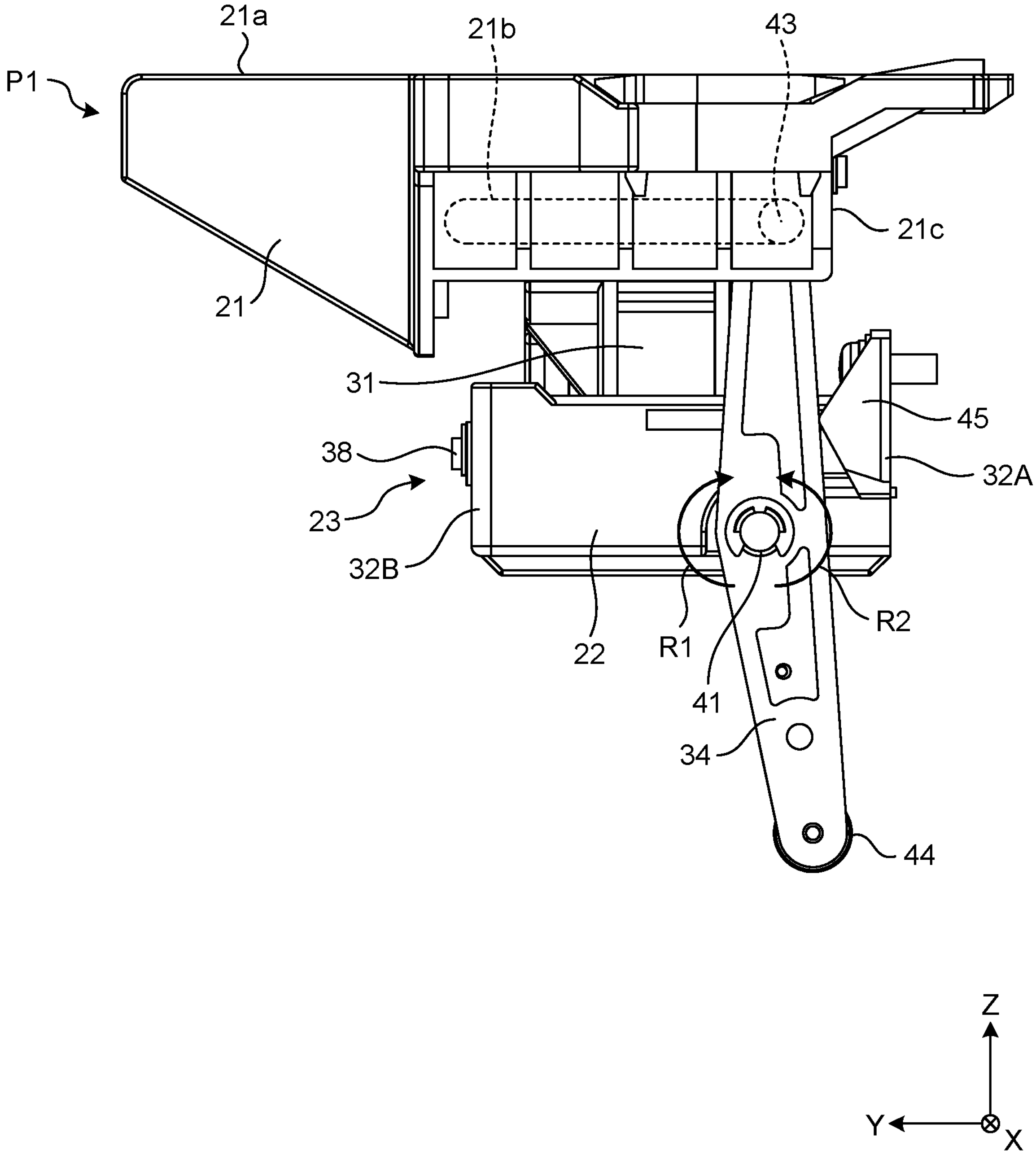
FIG. 6 is a side view illustrating a state in which the stage has been lifted to the high position by the first lifting lowering mechanism of the banknote storage device according to the embodiment.

FIG. 4 is a front perspective view illustrating a state in which the stage 21 has been lifted to the high position P1 by the first lifting lowering mechanism 23 of the banknote storage device 14 according to the embodiment. FIG. 5 is a rear perspective view illustrating a state in which the stage 21 has been lifted to the high position P1 by the first lifting lowering mechanism 23 of the banknote storage device 14 according to the embodiment. FIG. 6 is a side view illustrating a state in which the stage 21 has been lifted to the high position P1 by the first lifting lowering mechanism 23 of the banknote storage device 14 according to the embodiment.

Figure 7:
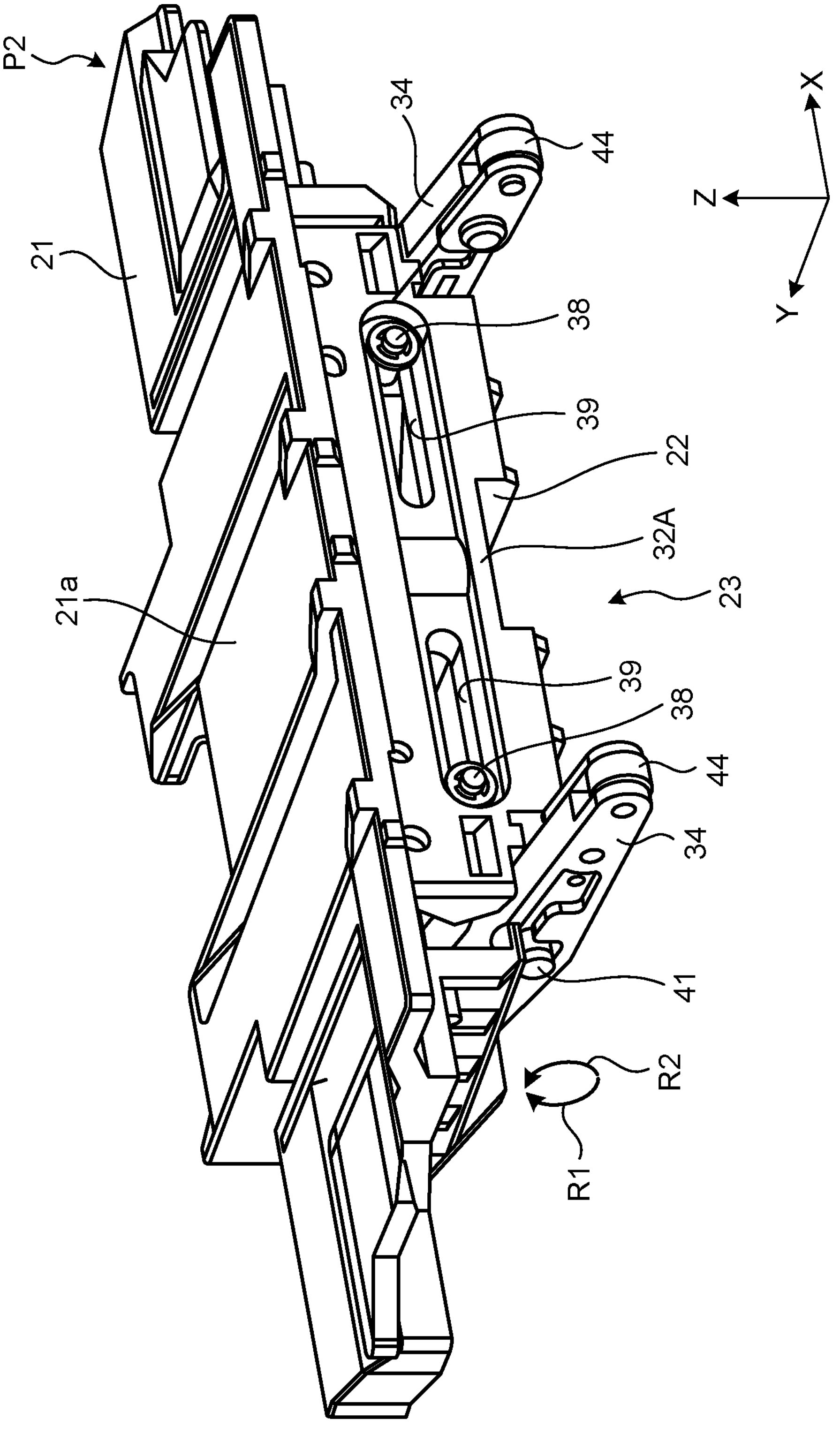
FIG. 7 is a front perspective view illustrating a state in which the stage has been lowered to a low position by the first lifting lowering mechanism of the banknote storage device according to the embodiment.
Figure 8:
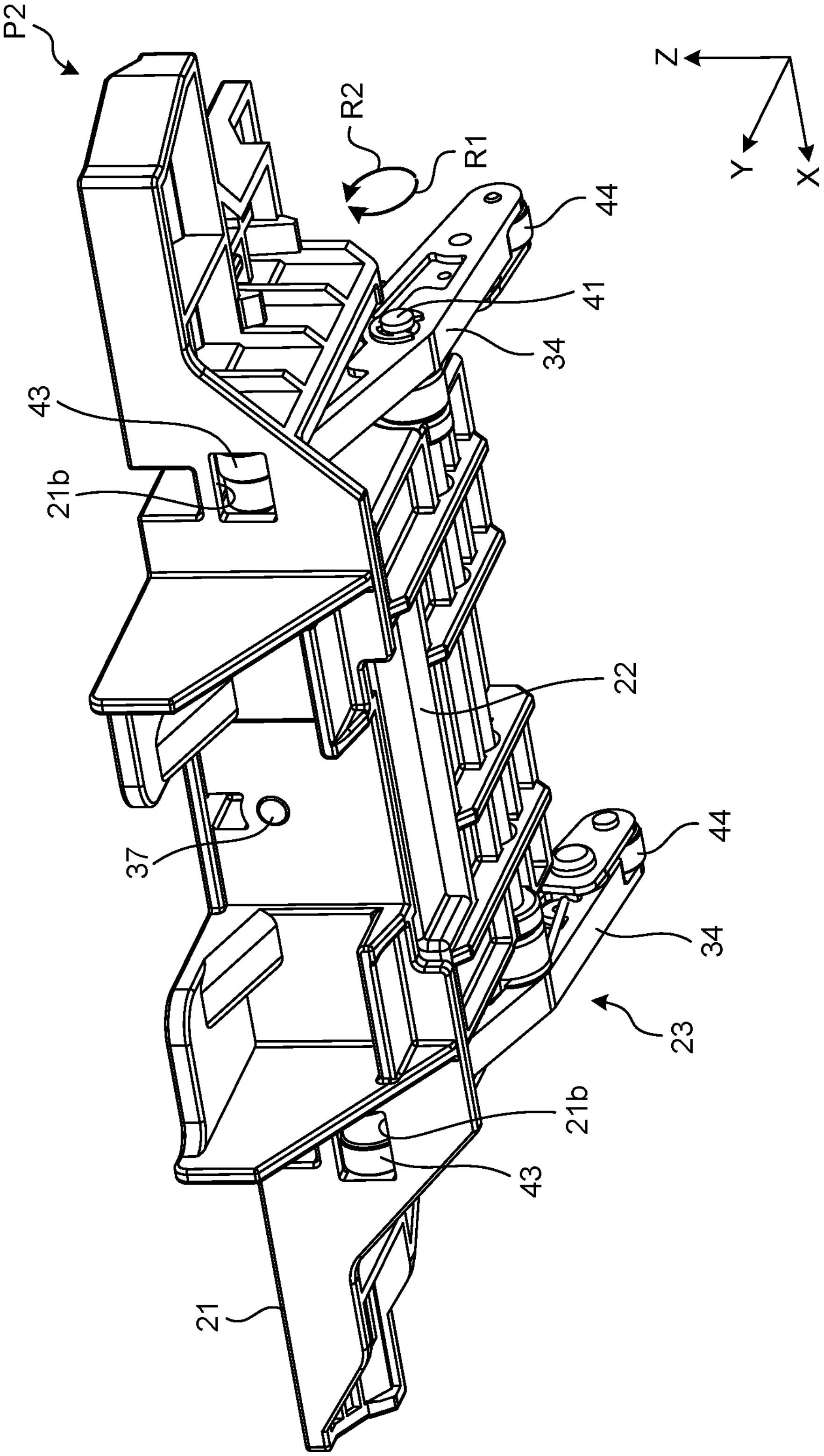
FIG. 8 is a rear perspective view illustrating a state in which the stage has been lowered to the low position by the first lifting lowering mechanism of the banknote storage device according to the embodiment.
Figure 9:
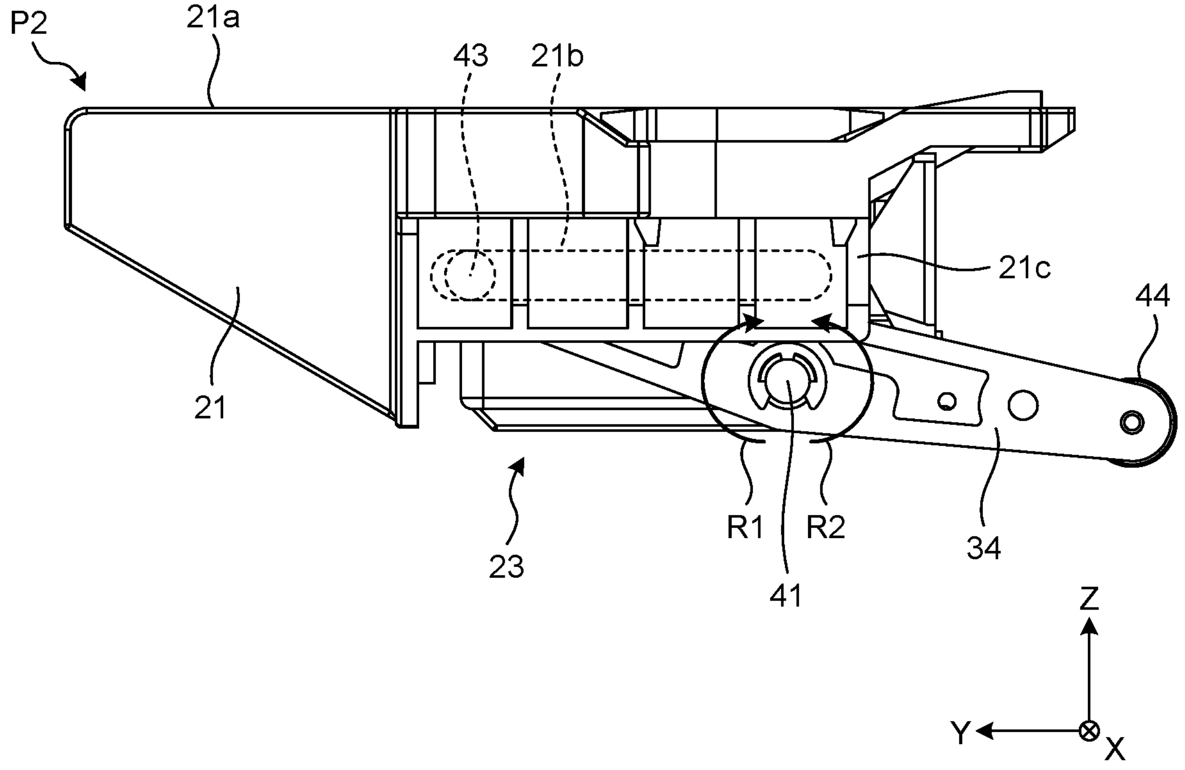
FIG. 9 is a side view illustrating a state in which the stage has been lowered to the low position by the first lifting lowering mechanism of the banknote storage device according to the embodiment.

FIG. 7 is a front perspective view illustrating a state in which the stage 21 has been lowered to the low position P2 by the first lifting lowering mechanism 23 of the banknote storage device 14 according to the embodiment. FIG. 8 is a rear perspective view illustrating a state in which the stage 21 has been lowered to the low position P2 by the first lifting lowering mechanism 23 of the banknote storage device 14 according to the embodiment. FIG. 9 is a side view illustrating a state in which the stage 21 has been lowered to the low position P2 by the first lifting lowering mechanism 23 of the banknote storage device 14 according to the embodiment.

As illustrated in FIGS. 4 to 6 and 7 to 9, the first lifting lowering mechanism 23 is provided on the support base 22 and has a pair of link members 31 for moving the stage 21 in the Z direction relative to the support base 22, and a pair of front side guide member 32A and back side guide member 32B that movably support the pair of link members 31.

As illustrated in FIGS. 4, 5, 7, and 8, the pair of link members 31 are supported on the support base 22 so as to be movable in the X direction. One end of each link member 31 is rotatably connected to a central portion of the stage 21 in the X direction with a support shaft 37 interposed therebetween. The other end of each link member 31 is connected to the front side guide member 32A and the back side guide member 32B with a support shaft 38 interposed therebetween so as to be slidable in the X direction. The front side guide member 32A and the back side guide member 32B are provided on respective sides of the support base 22 in the Y direction. The front side guide member 32A and the back side guide member 32B are provided with a guide slit 39 along the X direction that slidably supports the support shaft 38 at the other end of each link member 31.

The rotary lever 34 for operating the first lifting lowering mechanism 23 is disposed on both sides of the support base 22 in the X direction, and a central portion of the rotary lever 34 in a longitudinal direction is supported on the support base 22 with a rotary shaft 41 interposed therebetween so as to be rotatable in the R1 and R2 directions. A roller 43 is rotatably provided at one end of the rotary lever 34, and the one end of the rotary lever 34 is connected to the stage 21 with the roller 43 interposed therebetween. The stage 21 has a guide groove **21*b* along the Y direction through which the roller 43 at one end of the rotary lever 34** moves.

At one end of the guide groove **21*b* of the stage 21, a regulation wall 21*c* is provided with which one end of the rotary lever 34 comes into contact, when the mounting surface 21*a* of the stage 21 is in a horizontal posture parallel to the X-Y plane. When the rotary lever 34 rotating in the R1 direction moves the stage 21 to the high position P1, the regulation wall 21*c* restricts the rotation of the rotary lever 34, so that the stage 21 stops at the high position P1. Therefore, the first lifting lowering mechanism 23 can stably move the mounting surface 21*a* of the stage 21** in parallel between the high position P1 and the low position P2.

Further, the front side guide member 32A of the first lifting lowering mechanism 23 is provided, on both sides in the X direction, with a regulation portion 45 with which the vicinity of a central portion of the rotary lever 34 comes into contact when the mounting surfaces **21*a* of the stage 21 are in a horizontal posture parallel to the X-Y plane. When the rotary lever 34 moves the stage 21 to the high position P1, the regulation portion 45 restricts the rotation of the rotary lever 34, so that the stage 21 stops at the high position P1. This heightens reliability of operation of the first lifting lowering mechanism 23 for moving the mounting surface 21*a* of the stage 21** in parallel between the high position P1 and the low position P2.

Since the rotary lever 34 is restricted by the regulation wall **21*c* and the regulation portion 45 in this way, the stage 21 is kept at the high position P1, so that the banknotes 6 on the stage 21 are pressed against the pickup roller 25** with stable force.

Further, a roller 44 is rotatably provided at the other end of the rotary lever 34, and the roller 44 rolls along a guide surface 56 of an operating member 55, which will be described later, provided on a bottom surface **20*a* on the lower end side of the storage space 20**.

The torsion spring 35 is attached to the rotary shaft 41 that supports the central portion of the rotary lever 34. As illustrated in FIG. 2, one end of the torsion spring 35 is fixed to the support base 22, and the other end of the torsion spring 35 is fixed to the rotary lever 34. As a result, the torsion spring 35 urges the rotary lever 34 to rotate around the rotary shaft 41 in the R1 direction. Therefore, a state where the stage 21 has been moved to the high position P1 by the urging force of the torsion spring 35, is an initial state of the stage 21.

With the first lifting lowering mechanism 23, when the stage 21 approaches the lower end of the storage space 20, the stage 21 is moved from the high position P1 to the low position P2 by the rotary lever 34. This allows more banknotes 6 corresponding to a difference in height between the high position P1 and the low position P2 to be accumulated on the stage 21, thereby increasing the number of banknotes 6 that can be stored in the storage space 20. The difference in height between the high position P1 and the low position P2, is set to, for example, about 20 mm, and about 200 banknotes 6 can be additionally stored.

Figure 10A:
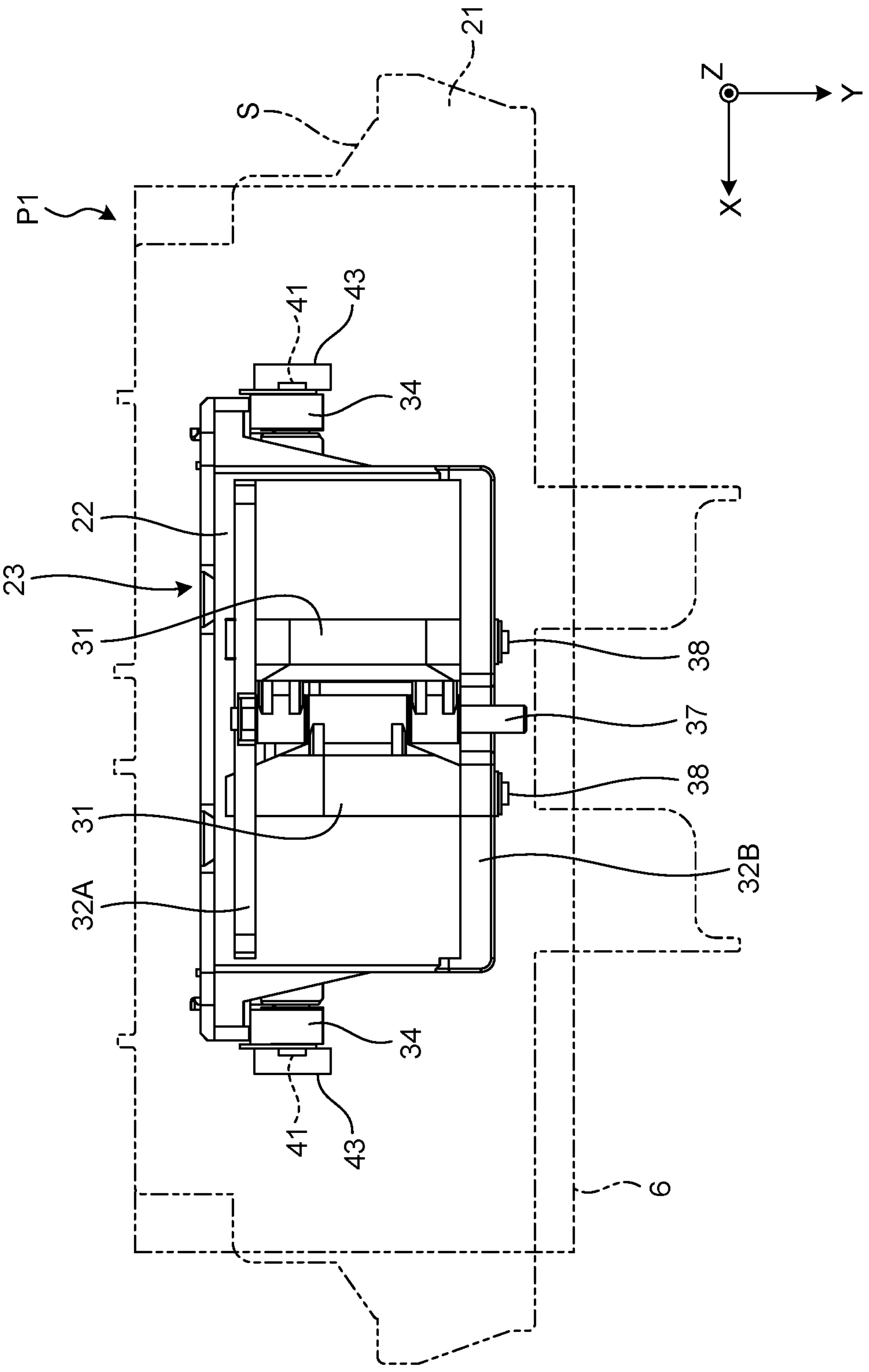
FIG. 10A is a plan view illustrating a state in which the stage has been lifted to the high position by a support base and the first lifting lowering mechanism, and a projection area of the stage, according to the embodiment.
Figure 10B:
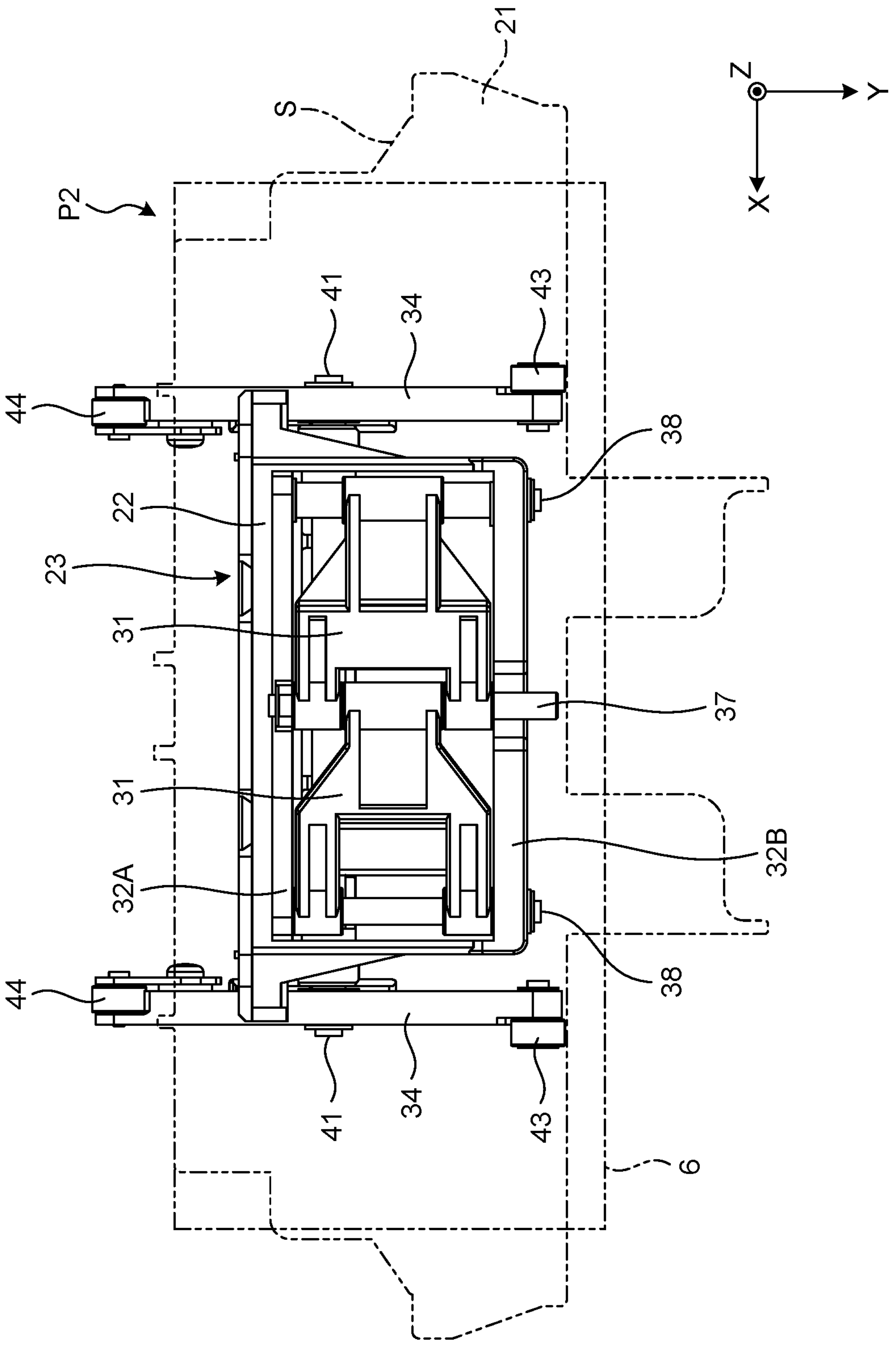
FIG. 10B is a plan view illustrating a state in which the stage has been lowered to the low position by the support base and the first lifting lowering mechanism, and the projection area of the stage, according to the embodiment.

FIG. 10A is a plan view illustrating a state in which the stage 21 has been lifted to the high position P1 by the support base 22 and the first lifting lowering mechanism 23, and a projection area of the stage 21, according to the embodiment. FIG. 10B is a plan view illustrating a state in which the stage 21 has been lowered to the low position P2 by the support base 22 and the first lifting lowering mechanism 23, and a projection area of the stage 21, according to the embodiment. FIGS. 10A and 10B illustrate a plane orthogonal to a lifting lowering direction (Z direction) in which the second lifting lowering mechanism 24 lifts and lowers the support base 22.

As illustrated in FIGS. 10A and 10B, the support base 22 and the first lifting lowering mechanism 23 are disposed within a projection area S in which the stage 21 is projected on the plane orthogonal to the lifting lowering direction (Z direction) in which the second lifting lowering mechanism 24 lifts and lowers the support base 22. Accordingly, an external dimension of the support base 22 is smaller than an external dimension of the stage 21 so as to fit within the projection area S of the stage 21.

Since the support base 22 and the first lifting lowering mechanism 23 are disposed within the projection area S of the stage 21, when the stage 21, on which the banknotes 6 are placed, is lowered along the Z direction between the upper end and the lower end of the storage space 20, the banknote storage device 14 can be prevented from becoming large in size due to the support base 22 and the first lifting lowering mechanism 23.

As illustrated in FIG. 10A, the rotary lever 34 is also disposed within the projection area S in a state where the stage 21 has been lifted to the high position P1 by the first lifting lowering mechanism 23. As illustrated in FIG. 10B, only a part of the end portion of the rotary lever 34 projects to an outside of the projection area S in a state where the rotary lever 34 lowers the stage 21 to the low position P2. By thus disposing the rotary lever 34, the banknote storage device 14 is prevented from becoming large in size due to the rotary lever 34. A length and a shape of the rotary lever 34 may be adjusted as appropriate so that the whole rotary lever 34 fits within the projection area S of the stage 21, even in a state where the stage 21 has been lowered to the low position P2.

Configuration of Second Lifting Lowering Mechanism

As illustrated in FIGS. 2 and 3, the second lifting lowering mechanism 24 has a pair of lifting lowering guide members 46 that guide the support base 22 in the lifting lowering direction (Z direction) and a drive belt 47 that moves the support base 22 in the lifting lowering direction (Z direction). Further, the second lifting lowering mechanism 24 has a pulley 48 on which the drive belt 47 is suspended, a base support member 49 that is connected to the support base 22, and a fixing member 50 for fixing the base support member 49 to the drive belt 47.

The pair of lifting and lowering guide members 46 are disposed on both sides of the support base 22 in the X direction. The drive belt 47 is disposed along the Z direction, and the stage 21 is connected to a part of the drive belt 47 in a length direction with the fixing member 50 and the base support member 49 interposed therebetween. Further, as illustrated in FIG. 2, the fixing member 50 is provided with a detection piece 50*a* whose position is detected by a lower end sensor 52, which will be described later. The second lifting lowering mechanism 24 is driven under control of the control unit 16 of the banknote handling device 1 described above.

Further, as illustrated in FIG. 2, the drive belt 47 of the second lifting lowering mechanism 24 is disposed on the feeding roller 26 side of the support base 22 in the Y direction, that is, on a side where the banknotes 6 are fed out of the stage 21 by the feeding roller 26 and the separation roller 27. As described above, in the banknote storage device 14, the drive belt 47 is disposed in an empty space created below a space for a support structure for the convey rollers such as the feeding roller 26 and the separation roller 27. This allows the second lifting lowering mechanism 24 to be disposed compactly, thereby achieving a reduction in size of the banknote storage device 14.

In the storage space 20 of the banknote storage device 14, an upper end sensor 51 that detects an upper end of the banknotes 6 accumulated on the stage 21, and a lower end sensor 52 that detects that the stage 21, on which the banknotes 6 are accumulated, has been lowered to the lower end of the storage space 20, as illustrated in FIG. 2.

The upper end sensor 51 is disposed at the upper end of the storage space 20 and has a light emitting unit 51*a* that emits detection light, and a light receiving unit 51*b* that receives the detection light emitted by the light emitting unit 51*a*. The lower end sensor 52 is disposed at the lower end of the storage space 20 and has a light emitting unit 52*a* that emits detection light, and a light receiving unit 52*b* that receives the detection light emitted by the light emitting unit 52*a*. The upper end sensor 51 and the lower end sensor 52 are electrically connected to the control unit 16, and the control unit 16 controls the second lifting lowering mechanism 24 based on detection results of the upper end sensor 51 and the lower end sensor 52.

The control unit 16 detects that the banknotes 6, which is placed on the stage 21, have reached the upper end, when detection light of the upper end sensor 51 is blocked by an upper end (a topmost banknote 6) of the banknotes 6 on the stage 21. The control unit 16 controls the second lifting lowering mechanism 24 to lower the stage 21 by a predetermined height when the upper end sensor 51 detects the banknotes 6 on the stage 21. The control unit 16 detects that the stage 21 has been lowered to the lower end of the storage space 20 together with the support base 22, when detection light of the lower end sensor 52 is blocked by the detection piece 50*a* of the fixing member 50 that is connected to the stage 21. When the lower end sensor 52 detects lowering of the stage 21, the control unit 16 determines that the storage space 20 has become full of banknotes 6 and stops driving the second lifting lowering mechanism 24 and the convey rollers.

Configuration of Convey Rollers

Figure 12:
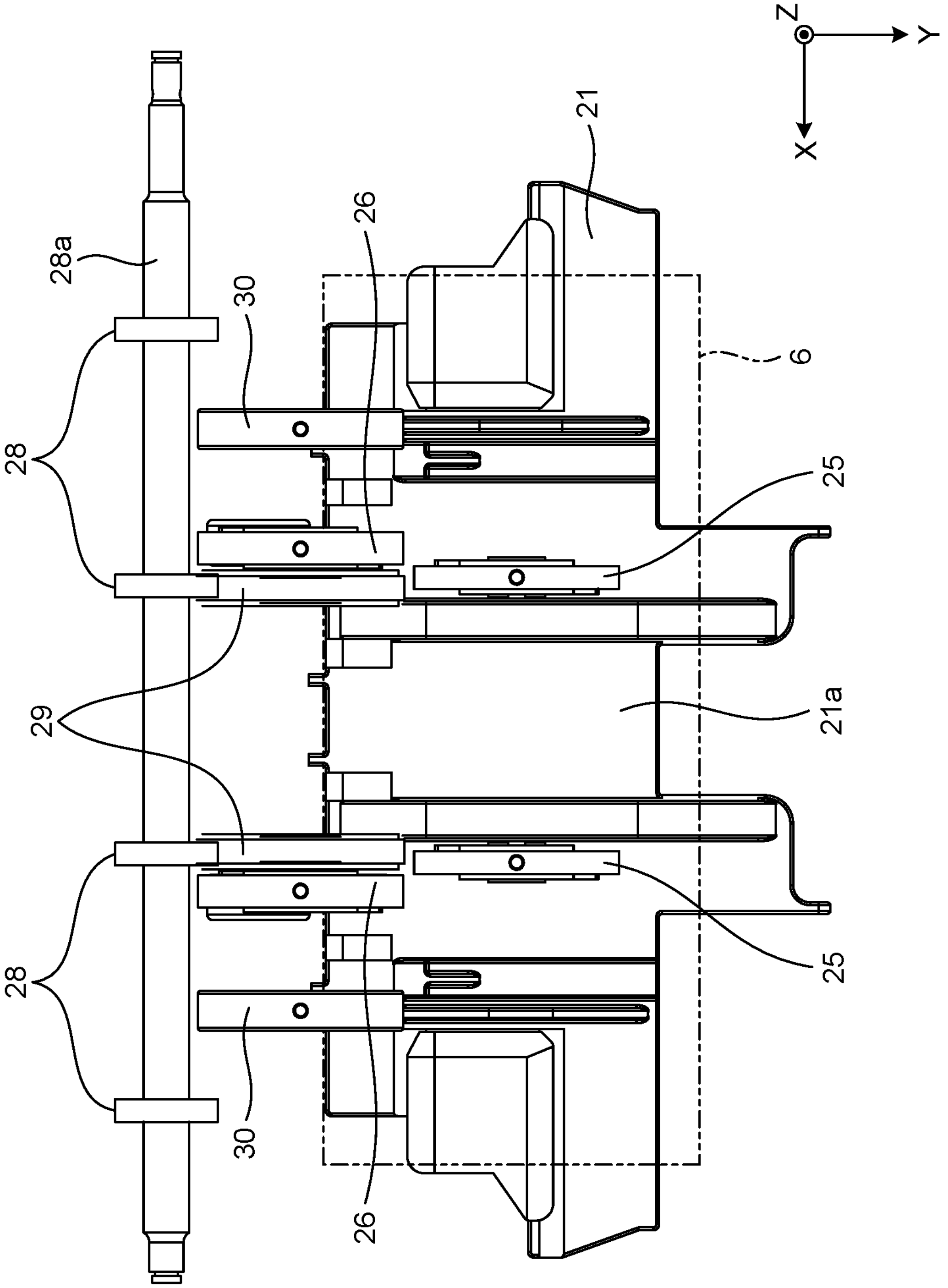
FIG. 12 is a plan view illustrating convey rollers of the banknote storage device according to the embodiment.
Figure 13:
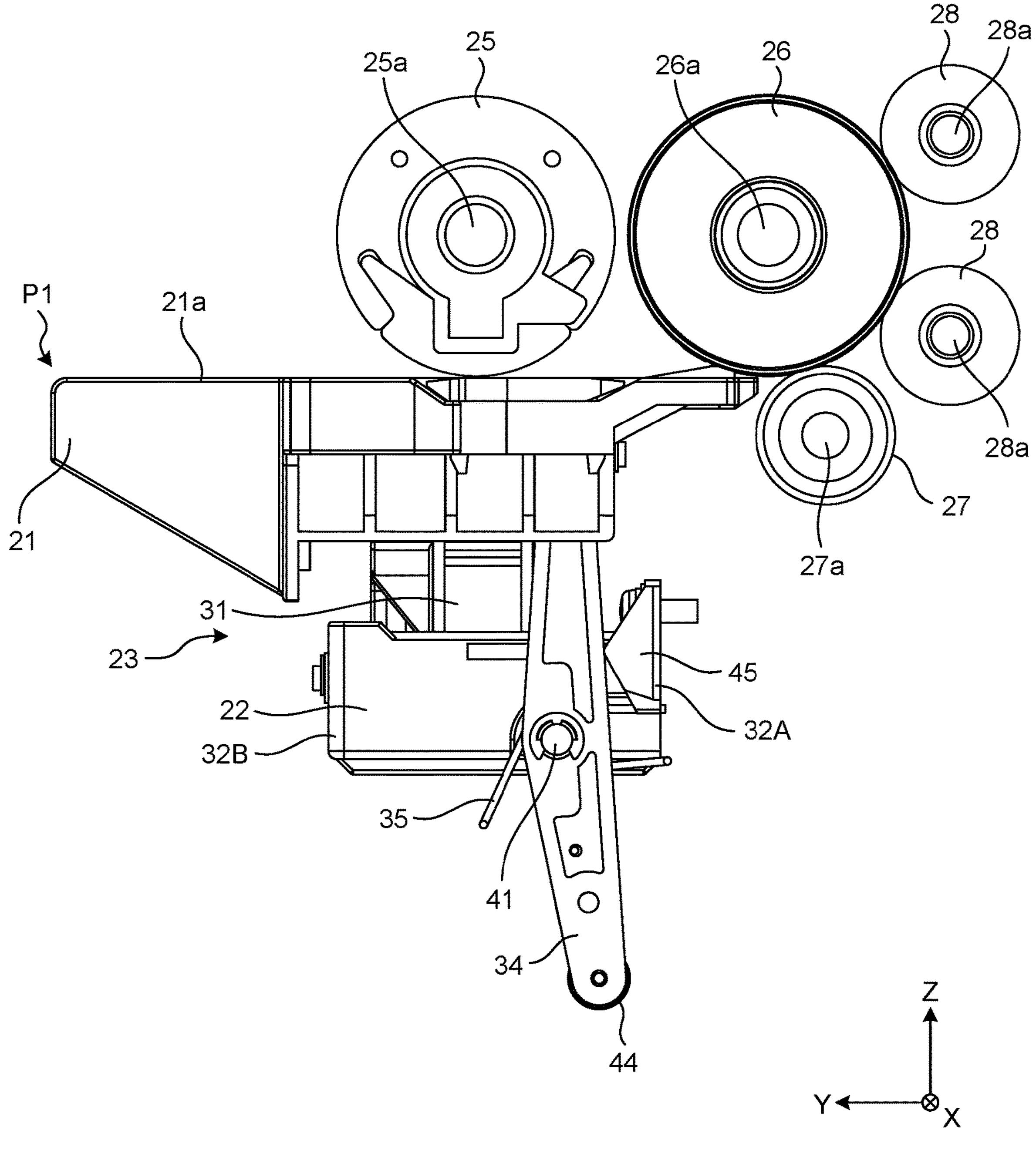
FIG. 13 is a side view illustrating convey rollers of the banknote storage device according to the embodiment.
Figure 14:
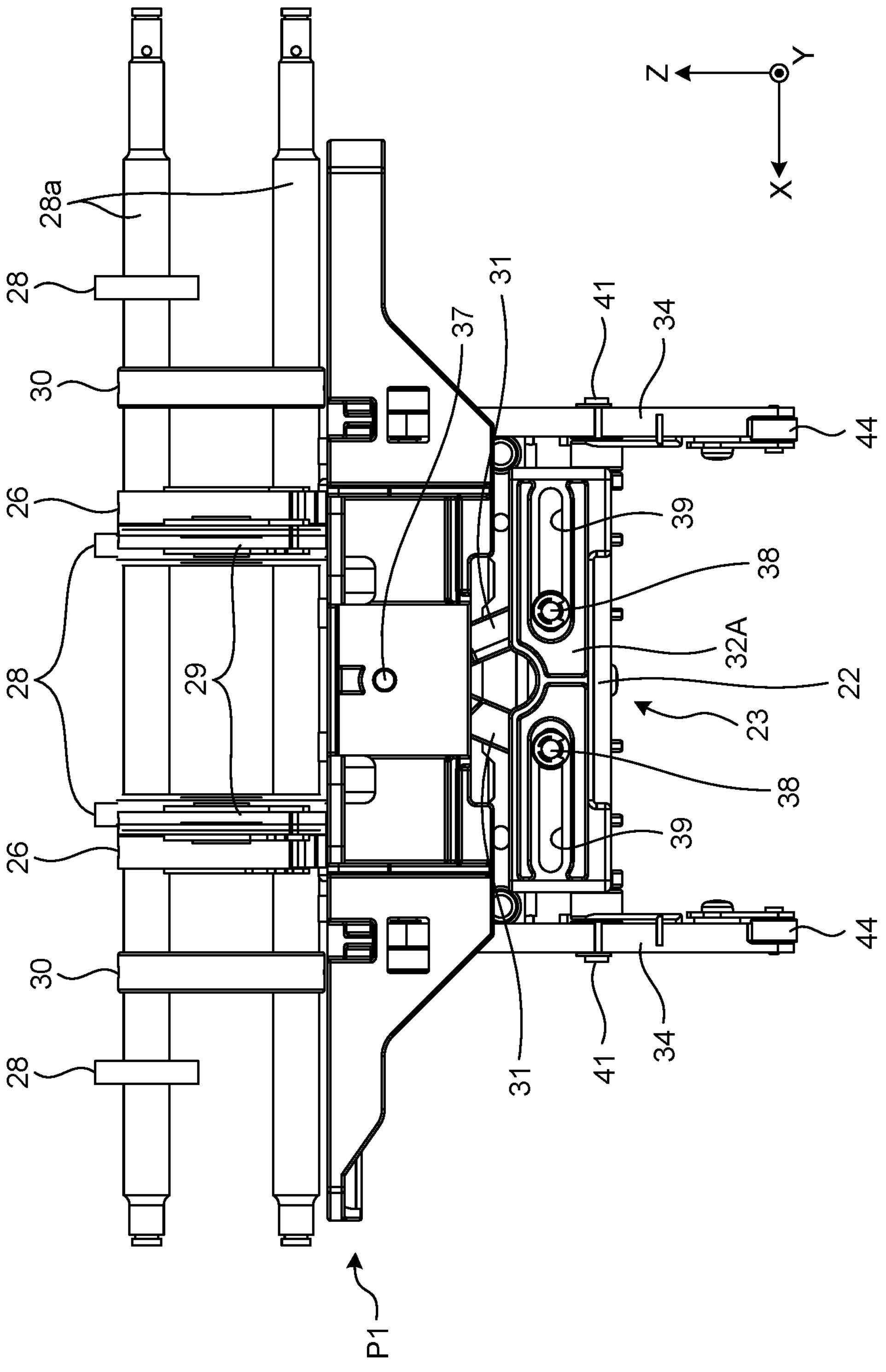
FIG. 14 is a rear view illustrating a state in which a pickup roller is in contact with banknotes on the stage of the banknote storage device according to the embodiment.

FIG. 11 is a perspective view illustrating the convey rollers of the banknote storage device 14 according to the embodiment. FIG. 12 is a plan view illustrating the convey rollers of the banknote storage device 14 according to the embodiment. FIG. 13 is a side view illustrating the convey rollers of the banknote storage device 14 according to the embodiment. FIG. 14 is a rear view illustrating a state in which the pickup roller 25 is in contact with the banknotes 6 on the stage 21 of the banknote storage device 14 according to the embodiment.

As illustrated in FIGS. 2 and 11 to 14, the convey rollers are disposed in an upper part of the storage space 20. The convey rollers include the pickup roller 25 that feeds out the banknotes 6 on the stage 21, the feeding roller 26 and the separation roller 27 that feed the banknotes 6 fed by the pickup roller 25 one by one separately, and the acceleration roller 28 for accelerating and conveying the banknotes fed from the feeding roller 26.

The pickup roller 25 is supported by a rotary shaft 25*a* and is disposed so as to face the mounting surface 21*a* of the stage 21. The feeding roller 26 is supported by a rotary shaft 26*a* and is disposed on one end side of the stage 21 in the Y direction. The separation roller 27 is supported by a rotary shaft 27*a* and is disposed below the feeding roller 26. An idler roller 29 is rotatably supported on the rotary shaft 26*a* of the feeding roller 26, and the idler roller 29 is disposed adjacent to the feeding roller 26. Further, the rotary shaft 26*a* of the feeding roller 26, is provided with a guide roller 30 that is spaced apart from the feeding roller 26. A plurality of acceleration rollers 28 are disposed in the vicinity of the feeding roller 26 along the convey direction of the banknotes 6. Each acceleration roller 28 is supported by a rotary shaft 28*a*. The pickup roller 25, the feeding roller 26, the guide roller 30, and the acceleration rollers 28, are driven to rotate by a drive mechanism (not illustrated).

Figure 15:
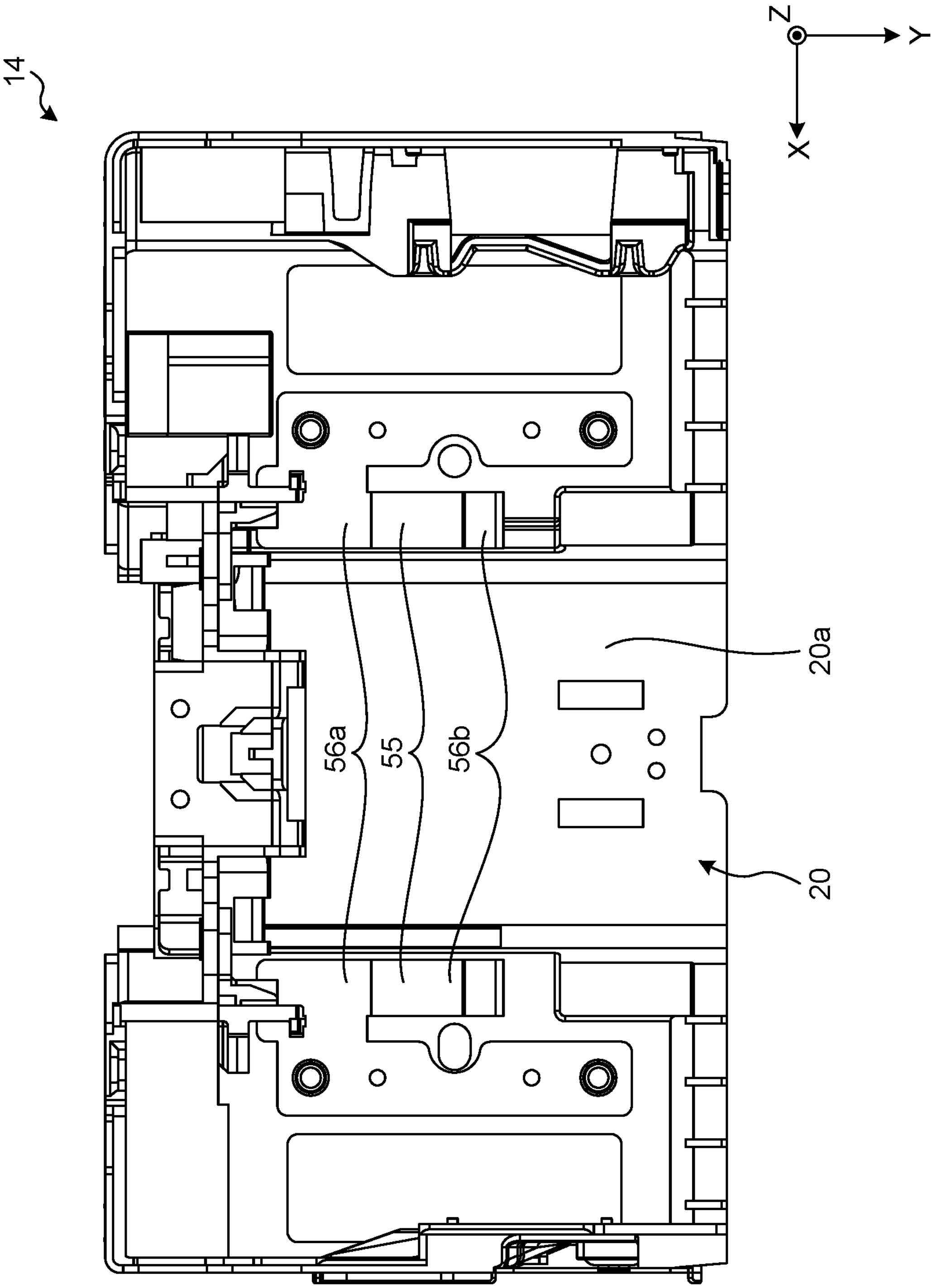
FIG. 15 is a plan view for explaining an operating member of the banknote storage device according to the embodiment.
Figure 16:
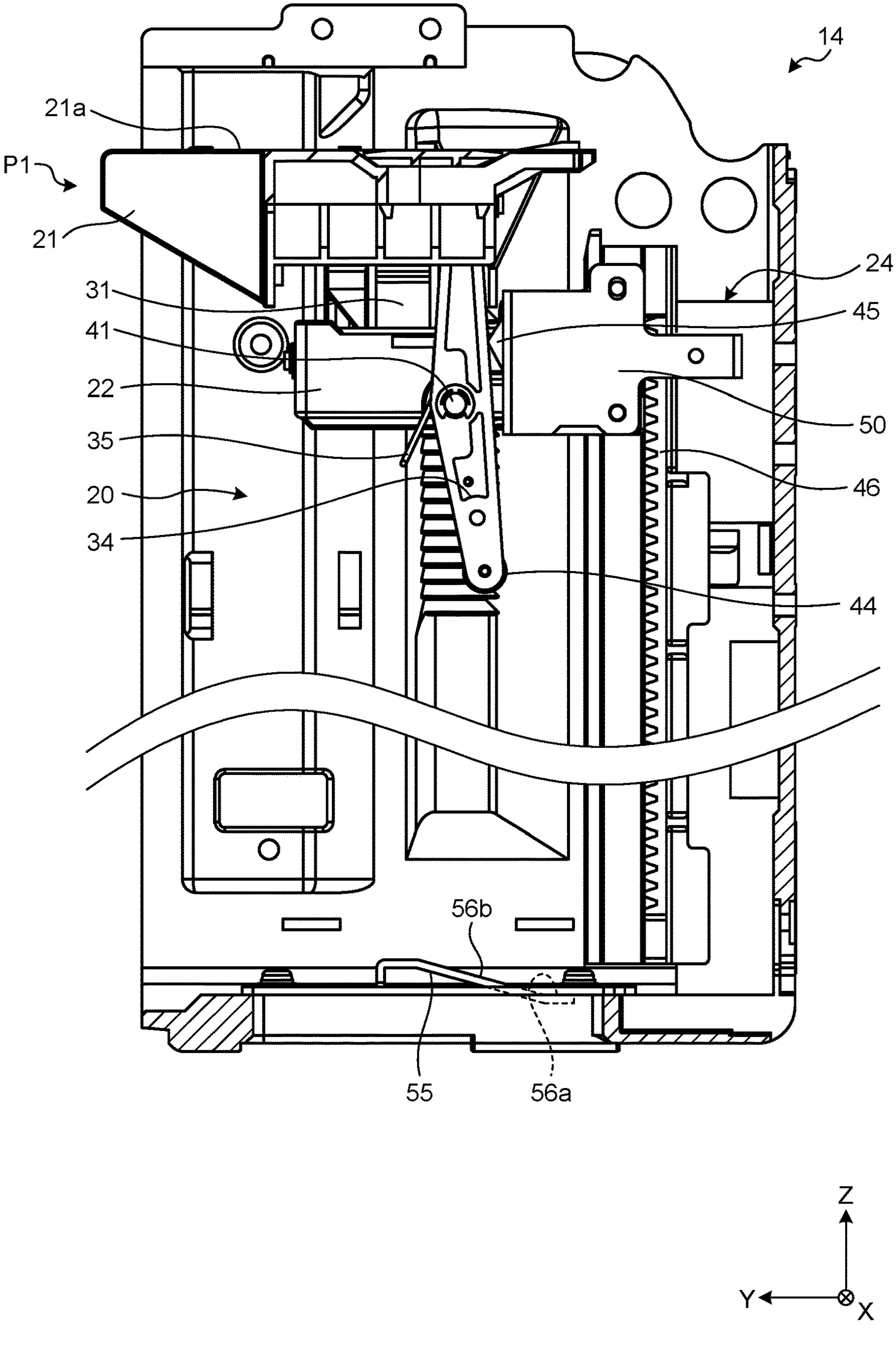
FIG. 16 is a side view for explaining the operating member of the banknote storage device according to the embodiment.

FIG. 15 is a plan view for explaining the operating member 55 of the banknote storage device 14 according to the embodiment. FIG. 16 is a side view for explaining the operating member 55 of the banknote storage device 14 according to the embodiment.

As illustrated in FIGS. 3, 15 and 16, a pair of operating members 55 for operating the rotary lever 34 of the first lifting lowering mechanism 23, is provided on the bottom surface 20*a* on the lower end side in the storage space 20. The operating member 55 has a guide surface 56 on which the roller 44 at the end of the rotary lever 34 rolls. The guide surface 56 has a first surface 56*a* orthogonal to the lifting lowering direction (Z direction) of the stage 21, and a second surface 56*b* inclined with respect to the first surface 56*a* and continuous with the first surface 56*a*.

The operating member 55 is made of a plate material and is fixed to the bottom surface 20*a* of the storage space 20. The first surface 56*a* and the second surface 56*b* of the guide surface 56 are disposed along the Y direction. The second surface 56*b* is provided so as to face the roller 44 of the rotary lever 34 that moves up and down together with the support base 22 in the storage space 20 (see FIG. 17).

Figure 17:
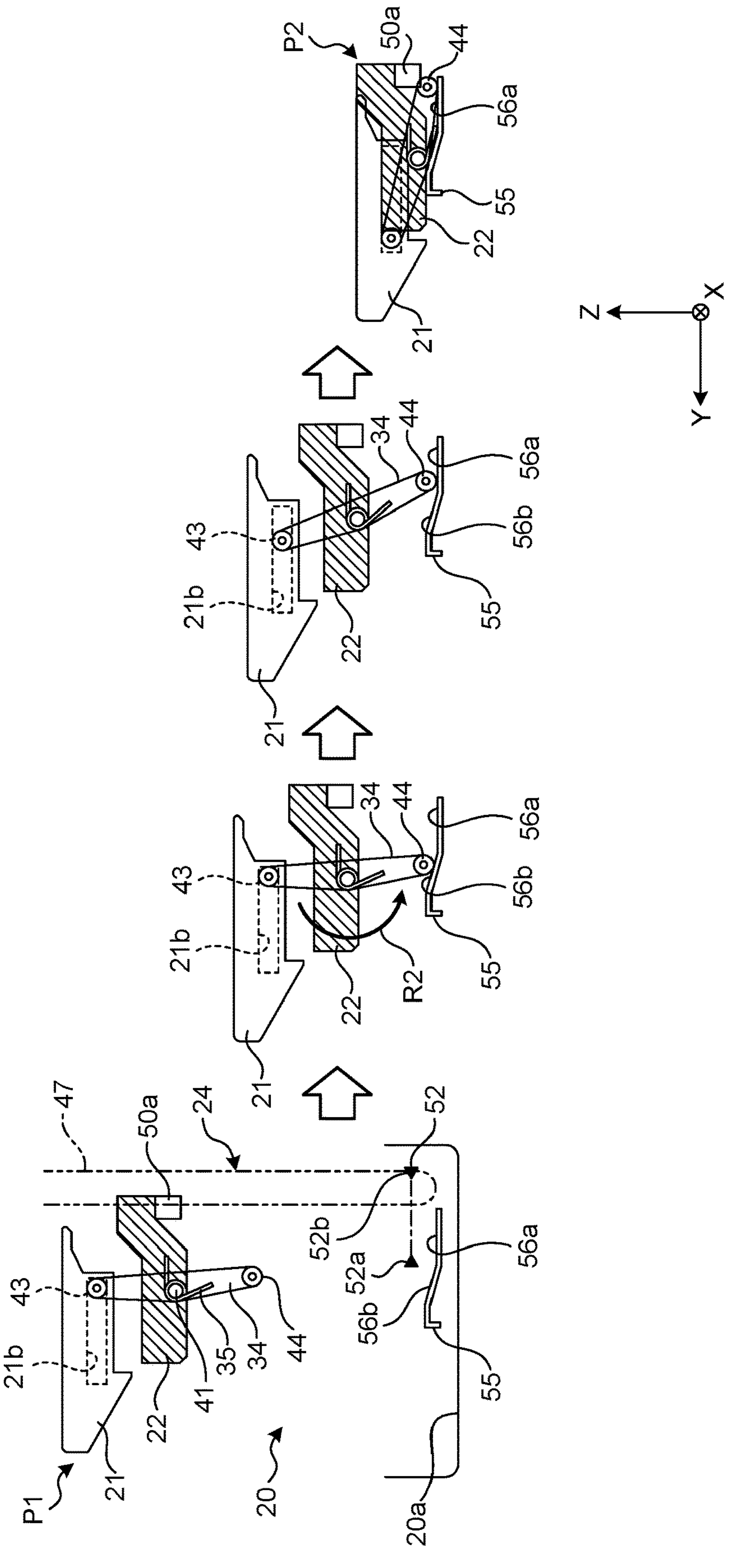
FIG. 17 is a side view for explaining how a rotary lever is rotated by the operating member in the banknote storage device according to the embodiment.

FIG. 17 is a side view for explaining how the rotary lever 34 is rotated by the operating member 55 in the banknote storage device 14 according to the embodiment. As illustrated in FIG. 17, as the stage 21 descends toward the lower end of the storage space 20, the roller 44 of the rotary lever 34 that moves up and down together with the support base 22 approaches the second surface 56*b* of the operating member 55. When the stage 21 further descends toward the lower end of the storage space 20, the roller 44 of the rotary lever 34 comes into contact with the second surface 56*b* of the operating member 55.

As the stage 21 is gradually brought close to the lower end of the storage space 20 by the second lifting lowering mechanism 24, the rotary lever 34 rolls along the inclination on the second surface 56*b*, and smoothly moves from the second surface 56*b* to the first surface 56*a*. As the roller 44 of the rotary lever 34 moves from the second surface 56*b* to the first surface 56*a*, the rotary lever 34 smoothly rotates in the R2 direction around the rotary shaft 41 against the urging force of the torsion spring 35. Since the rotary lever 34 is thus rotated in the R2 direction by the operating member 55, the stage 21 is smoothly moved from the high position P1 to the low position P2. When the stage 21 moves to the low position P2, the lower end sensor 52 detects the detection piece 50*a* that is lowered together with the support base 22. In response to this, the control unit 16 causes the second lifting lowering mechanism 24 to stop lowering the support base 22.

On the other hand, the roller 44 of the rotary lever 34 moves from the first surface 56*a* to the second surface 56*b* and moves away from the second surface 56*b*, when the stage 21 is lifted from the lower end of the storage space 20 by the second lifting lowering mechanism 24. As a result, the rotary lever 34 is rotated in the R1 direction around the rotary shaft 41 by the urging force of the torsion spring 35. When the rotary lever rotates in the R1 direction, the stage 21 is lifted to the high position P1 by the first lifting lowering mechanism 23. As described above, in the banknote storage device 14, the lifting lowering operation of the first lifting lowering mechanism 23, can be linked with the lifting lowering operation of the second lifting lowering mechanism 24 through the rotary lever 34.

Therefore, the lifting lowering operation in which the stage 21 moves in parallel between the high position P1 and the low position P2, can be controlled by the control unit 16 through the operation in which the second lifting lowering mechanism 24 lowers and lifts the support base 22. That is, the operation of lifting and lowering the stage 21 by the first lifting lowering mechanism 23, can be controlled through the rotary lever 34 by the control unit 16 by controlling driving of the second lifting lowering mechanism 24. The control unit 16 may perform control so that the banknotes 6 are accumulated on the stage 21, for example, by temporarily stopping the stage 21 at an intermediate position or plural positions between the high position P1 and the low position P2, as in an operation in which the second lifting lowering mechanism 24 intermittently lowers the stage 21.

Banknote Storing Operation

In the banknote storage device 14, the stage 21 is located in the vicinity of the upper end of the storage space 20 when no banknote 6 is stored in the storage space 20. In this case, the stage 21 has been lifted to the high position P1 by the first lifting lowering mechanism 23. As the banknotes 6 are carried into the storage space 20 by the convey rollers such as the feeding roller 26 and the banknotes 6 are accumulated on the stage 21, the second lifting lowering mechanism 24 intermittently lowers the stage 21 together with the support base 22 based on a detection result of the upper end sensor 51. The second lifting lowering mechanism 24 gradually lowers the stage 21 as the number of banknotes 6, which are accumulated on the stage 21, increases.

Subsequently, when the stage 21 approaches the lower end of the storage space 20 as described above, the stage 21 is lowered from the high position P1 to the low position P2 by the rotary lever 34. This allows more banknotes 6 corresponding to the difference in height between the high position P1 and the low position P2 to be accumulated on the stage 21. Then, when the stage 21 moves to the low position, the lower end sensor 52 detects the detection piece 50*a*. As a result, the lowering of the stage 21 stops.

On the other hand, when the second lifting lowering mechanism 24 lifts the stage 21, on which the banknotes 6 are accumulated, from the lower end of the storage space, the stage 21 is lifted to the high position P1 relative to the support base 22 by the urging force of the torsion spring 35. Subsequently, the second lifting lowering mechanism 24 gradually lifts, to the upper end of the storage space 20, the stage 21 that has been lifted to the high position P1 relative to the support base 22 so as to be linked with the operation of feeding out the banknotes 6 on the stage 21 by the convey rollers.

When the stage 21 is moved to the upper end of the storage space 20, the banknotes 6 on the mounting surface 21*a* of the stage 21, properly make contact with the pickup roller 25, and are fed toward the feeding roller 26 and the separation roller 27 by the pickup roller 25, as illustrated in FIGS. 13 and 14. Since the rotary lever 34 is restricted by the regulation wall 21*c* and the regulation portion 45, and thereby the stage 21 is kept at the high position P1, the banknotes 6 on the stage 21 can be pressed against the pickup roller 25 by stable force.

Effects of Embodiment

The banknote storage device 14 according to the embodiment includes the first lifting lowering mechanism 23 that lifts and lowers the stage 21 between the high position P1 and the low position P2 relative to the support base 22, and the second lifting lowering mechanism 24 that lifts and lowers the support base 22 in the storage space 20, and the support base 22 and the first lifting lowering mechanism 23 are disposed in the projection area S of the stage 21. This can prevent the whole banknote storage device 14 from becoming large in size, due to the space for disposing the support base 22 and the first lifting lowering mechanism 23. In addition, more banknotes 6 corresponding to the difference in height between the high position P1 and the low position P2 of the stage 21, can be accumulated on the stage 21, thereby increasing the number of banknotes 6 that can be stored in the storage space 20.

In a case where a thickness of a stage in a direction in which banknotes are accumulated in a storage space, that is, in a direction in which the stage is lifted and lowered, is reduced to increase the number of banknotes that can be stored in the storage space in a banknote storage device, a height of a mounting surface of the stage becomes lower as the thickness of the stage becomes smaller. Therefore, when the stage is moved to the topmost position by a lifting lowering mechanism, the banknotes on the mounting surface are not brought into contact with a pickup roller that feeds the banknotes on the stage. In a case where a height to which the stage can be lifted by the lifting lowering mechanism, is extended upward, in order to bring the banknotes on the mounting surface into contact with the pickup roller, a drive belt of the lifting lowering mechanism interferes with convey rollers such as a feeding roller. In a case where the position of the lifting lowering mechanism is changed, in order to avoid interference between the drive belt of the lifting lowering mechanism and the feeding roller, a space occupied by the lifting lowering mechanism around the stage increases, which leads to an increase in size of the whole banknote storage device. In view of such a problem, the banknote storage device 14 according to the present embodiment employs a structure, in which the stage 21 is lowered from the high position P1 to the low position P2 when the stage 21 is lowered to the lower end of the storage space 20, and the support base 22 and the first lifting lowering mechanism 23 are disposed within the projection area S of the stage 21. This can increase the number of banknotes 6 that can be stored in the storage space 20 without increasing the size of the whole banknote storage device 14.

Further, the banknote storage device 14 according to the embodiment includes the rotary lever 34 that operates the first lifting lowering mechanism 23, and the rotary lever 34 rotates when the support base 22 moves to the lower end of the storage space 20, so that the stage 21 is lowered to the low position P2. As a result, the first lifting lowering mechanism 23 can be operated with a simple structure, and the lifting lowering operation of the first lifting lowering mechanism 23 can be linked with the lifting lowering operation of the second lifting lowering mechanism 24 through the rotary lever 34.

Further, the rotary lever 34 in the banknote storage device 14 according to the embodiment is disposed in the projection area S in a state where the stage 21 has been lifted to the high position P1 by the first lifting lowering mechanism 23. This can further suppress an increase in size of the whole banknote storage device 14.

Further, the banknote storage device 14 according to the embodiment includes the torsion spring 35 that urges the rotary lever 34 in the R1 direction for lifting the stage 21 to the high position P1. As a result, the first lifting lowering mechanism 23 can be operated with a simple structure.

Further, the first lifting lowering mechanism 23 of the banknote storage device 14 according to the embodiment has the regulation portion 45 that regulates rotation of the rotary lever 34 when the rotary lever 34 lifts the stage 21 to the high position P1. As a result, the stage 21 can be stably kept at the high position P1, and reliability of the operation of lifting and lowering the stage 21, can be improved. Further, since the stage 21 is kept at the high position P1 by the regulation portion 45, the banknotes 6 on the stage 21 can be pressed against the pickup roller 25 with stable force.

Further, the banknote storage device 14 according to the embodiment includes the operating member 55 that operates the rotary lever 34, and the guide surface 56 of the operating member 55 on which the roller 44 of the rotary lever 34 rolls has the first surface **56*a* orthogonal to the direction (Z direction), in which the stage 21 is lifted and lowered, and a second surface 56*b* inclined with respect to the first surface 56*a* and continuous with the first surface 56*a*. As a result, the roller 44 rolls along the guide surface 56 as the stage 21 descends, so that the rotary lever 34 can be smoothly rotated. This can improve reliability of the operation of lowering the stage 21 from the high position P1 to the low position P2 by the first lifting lowering mechanism 23**.

Further, in the banknote storage device 14 according to the embodiment, the drive belt 47 of the second lifting lowering mechanism 24 is disposed on the feeding roller 26 side of the support base 22. As a result, in the banknote storage device 14, an empty space, created below the space for disposing the support structure for the convey rollers such as the feeding roller 26 and the separation roller 27, can be used as a space for disposing the drive belt 47. This allows the second lifting lowering mechanism 24 to be disposed compactly, thereby achieving a reduction in size of the banknote storage device 14.

The banknote storage device 14 according to the present embodiment is applied to the storage units 14 of the banknote handling device 1, but is not limited to the application as the storage units 14. The present embodiment can be used for a configuration for lifting and lowering a stage on which banknotes are accumulated and placed, and may be applied to, for example, the temporary holding units 13.

According to one aspect of the paper sheet storage device disclosed herein, the number of sheets of paper sheet, which can be stored, can be increased without increasing the size of the whole paper sheet storage device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A paper sheet storage device comprising:
- a storage space in which paper sheet is stored;
- a mounting table that is provided in the storage space and on which the paper sheet is accumulated and placed;
- a support base that supports the mounting table;
- a first lifting lowering mechanism that lifts and lowers the mounting table between a high position and a low position relative to the support base; and
- a second lifting lowering mechanism that lifts and lowers the support base in the storage space,
- wherein the support base and the first lifting lowering mechanism are disposed within a projection area in which the mounting table is projected on a plane orthogonal to a lifting lowering direction in which the support base is lifted and lowered by the second lifting lowering mechanism.

2. The paper sheet storage device according to claim 1, further comprising
- a rotary lever that operates the first lifting lowering mechanism,
- wherein the rotary lever is rotated when the support base moves to a lower end of the storage space, so that the mounting table is lowered to the low position.

3. The paper sheet storage device according to claim 2,
- wherein the rotary lever is disposed within the projection area in a state where the mounting table has been lifted to the high position by the first lifting lowering mechanism.

4. The paper sheet storage device according to claim 2, further comprising
- an urging member that urges the rotary lever in a direction for lifting the mounting table to the high position.

5. The paper sheet storage device according to claim 2,
- wherein the first lifting lowering mechanism has a regulation portion that regulates rotation of the rotary lever when the rotary lever lifts the mounting table to the high position.

6. The paper sheet storage device according to claim 2, wherein a roller is rotatably supported at one end of the rotary lever, an operating member that operates the rotary lever is provided on the lower end side of the storage space, and the operating member has a guide surface on which the roller rolls, and the guide surface has a first surface orthogonal to the lifting lowering direction in which the mounting table is lifted and lowered, and a second surface inclined with respect to the first surface and continuous with the first surface.

7. The paper sheet storage device according to claim 1, further comprising a feeding roller and a separation roller that feeds out the paper sheet on the mounting table one by one separately, wherein the second lifting lowering mechanism has a drive belt for lifting and lowering the support base, and the drive belt is disposed on the feeding roller side of the support base.

* * * * *